United States Patent
Vandermark

(10) Patent No.: US 7,793,959 B2
(45) Date of Patent: Sep. 14, 2010

(54) CUSTOMIZABLE CARBON FRAMES FOR BICYCLE OR OTHER VEHICLES

(75) Inventor: Robert Vandermark, Sommerville, MA (US)

(73) Assignee: Seven Cycles, Inc., Watertown, MA (US)

( * ) Notice: Subject to any disclaimer, the term of this patent is extended or adjusted under 35 U.S.C. 154(b) by 384 days.

(21) Appl. No.: 11/508,080

(22) Filed: Aug. 22, 2006

(65) Prior Publication Data
US 2007/0289136 A1    Dec. 20, 2007

(51) Int. Cl.
    *B62K 19/02*    (2006.01)
(52) U.S. Cl. .................................................. 280/281.1
(58) Field of Classification Search ............. 280/274, 280/281.1; 156/158, 293, 294
    See application file for complete search history.

(56) References Cited

U.S. PATENT DOCUMENTS

| | | | |
|---|---|---|---|
| 3,375,024 A | 3/1968 | Bowden | |
| 3,833,242 A | 9/1974 | Thompson, Jr. | |
| 4,230,332 A | 10/1980 | Porsche | |
| 4,493,749 A | 1/1985 | Brezina | |
| 4,598,922 A * | 7/1986 | Kleinebenne et al. | 280/279 |
| 4,900,049 A | 2/1990 | Tseng | |
| 4,986,949 A | 1/1991 | Trimble | |
| 5,019,312 A | 5/1991 | Bishop | |
| 5,100,162 A | 3/1992 | Lo | |
| 5,106,682 A | 4/1992 | Matsushita et al. | |
| 5,116,071 A | 5/1992 | Calfee | |
| 5,188,384 A | 2/1993 | Van Raemdonck | |
| 5,271,784 A | 12/1993 | Chen | |
| 5,613,794 A | 3/1997 | Isaac et al. | |
| 5,624,519 A | 4/1997 | Nelson | |
| 5,937,496 A * | 8/1999 | Benoit et al. | 29/419.2 |
| 2006/0038375 A1 * | 2/2006 | Parkin | 280/274 |

* cited by examiner

*Primary Examiner*—Tony H. Winner
(74) *Attorney, Agent, or Firm*—Todd S. Parkhurst; Hughes Socol Piers Resnick & Dym Ltd.

(57) ABSTRACT

A method of manufacturing a lightweight vehicle frame, and the end product frame, are disclosed. A first tube, which can be a cured hollow reinforced resin composite tube, is connected to a second part by a tab. The tab is tapered and is affixed to the first tube. The tab is bonded to the second part by an epoxy. The taper of the tab allows the angle at which the parts are connected to be controlled through a wide range.

11 Claims, 2 Drawing Sheets

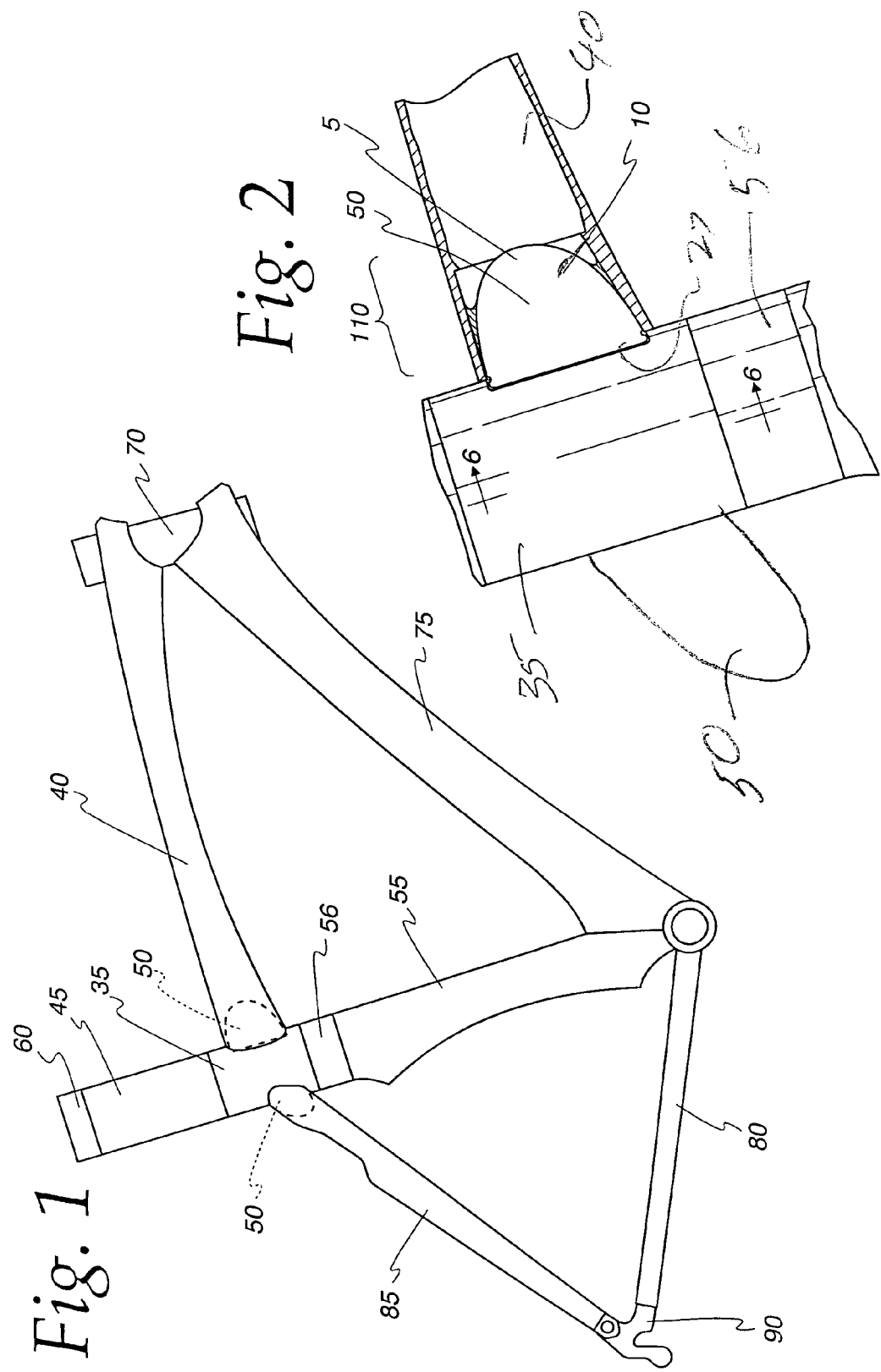

CUSTOMIZABLE CARBON FRAMES FOR BICYCLE OR OTHER VEHICLES

Customized bicycle manufacturers center their philosophy on fitting and functionality; the better the bicycle fits the rider, the better and more enjoyable a ride will be. Painstaking attention to detail in the manufacture of each frame is an imperative. At the inventor's manufacturing facility, frames are handcrafted one at a time based on the belief that excellence is a tangible quality ultimately measured by how well the frame responds to the rider's specific needs. Every single customized frame that is created is built to order, with geometry, tube diameter, tube thickness, and butting specifically chosen for the rider's size, weight, and riding style. Rider information is imputed into the bike building process as weight, flexibility, intended usage, and riding preferences. Based upon these parameters, for example, customized bike manufacturers customize the bike's tube set to enhance the frame's ride quality.

The joints in bicycle frames greatly influence the design, construction, and performance of the frames. Joints between frame members are not only the most frequent source of structural problems occurring in bicycle frames; they are also limiting factors regarding one's ability to customize a bicycle. This is because (1) internal structural loads are generally the greatest at the joints; (2) it is difficult to bond different materials at the joints; and (3) the joint components do not allow for any angle variability for the mating frame members. As a result, a number of proposals have been made to eliminate or greatly reduce the number of joints in the frames, through the greater use of composite materials. See U.S. Pat. Nos. 5,271,784; 3,375,024; 3,833,242; 4,493,749; 4,230,332; and 4,986,949. However, there still exists a need for joint components to facilitate a wide range of angles for the mating components of a bicycle frame.

Many modern bicycle frames make use of composite materials to reduce the weight of the frames. Composite materials have a lower density, higher specific strength and stiffness than traditionally used bicycle frame metals. One of the most common methods of joining composite tubes to each other employs the use of metal lugs at the joints and bonding of the composite tubes to the metal lugs. Traditional lugs—whether metal or composite—restrict the shape of the tubes to round and thus do not fully leverage carbon's unique formability and shaping opportunities.

There are several methods that have been employed to produce all-composite bicycle frames. One such method comprises joining together composite tubes by wrapping uncured composite materials around and between the ends and formed cuts of the pre-cut tubes to be connected and then curing the composite materials to form a connection between the tubes. See U.S. Pat. Nos. 5,188,384; 5,106,682; 5,019,312; 5,116,071; and 4,900,048. The resultant frame is solid at the joints.

Another method for forming an all composite jointed frame makes use of lugs formed of composite materials using a bladder. In this method, disclosed in U.S. Pat. No. 5,624,519, bicycle lugs are formed by inserting pre-forms of stacked resin-impregnated carbon fiber plies into respective halves of female tooling. A bladder is then placed over one of the pre-forms and the mold is closed. The bladder is then inflated to press the pre-forms against the tooling, and the mold heated to cure the resin to form the final cured lug. The pre-forms are sized so that each forms one half of the lug plus an overlapping portion that forms a lap edge. Accordingly, lugs manufactured by this process have dividing lines of overlapping cured composites. These dividing lines provide areas of weakness in the lugs and undesirable increased weight.

It is an object of this invention to provide an all composite frame that has low frame weight and high frame strength.

It is another object of this invention to provide a generally hollow bicycle frame, and processes for its manufacture. The frame is light in weight, stiff, and strong, and has a construction that is amenable to customization.

It is another object of this invention to provide all composite tube and tab components that are individually formed prior to assembly to have complementary opposing surfaces for coupling. Upon coupling, by adhesive bonding for example, a generally hollow frame is formed, having joints of a smooth exterior surface. The tabs provide for a uniform force transmission across each joint. The tabs may be internal and not visible on the exterior of the frame. Once the parts are assembled, as described below, the result is a frame that provides the appearance of a molded carbon frame, or monocoque frame.

It is another object of this invention to provide for a completely customizable bicycle frame based upon facilitating a wide range of tube joint angles at each joint within the bicycle frame; thereby allowing for greater customization of angles and lengths, and eliminating geometry constraints.

It is another object of this invention to provide a frame stiff enough and light enough for instant acceleration yet vertically compliant enough to smooth out unforgiving terrain.

SUMMARY OF THE INVENTION

Many bicycle, scooter, wheelchair and other vehicle frames are manufactured using parts that are molded together to form a complete frame. This invention is concerned with all composite vehicle frames, in particular a bicycle frame, made of joined parts comprising carbon fibers impregnated with resin, for example. An exemplary bicycle frame of the present invention can be formed by joining composite tubes and tabs, wherein the frame tabs are located at the joints of the frame tubes and serve as connecting members between the various frame tubes 50. Once the parts are assembled, as described below, the result is a frame that provides the appearance of a molded carbon frame, or monocoque frame. This frame is completely customizable; any shape and size of tube, and any angle between tubes, can be provided without limiting customization. In a preferred embodiment, rider information is imputed into the bike building process as weight of the rider, height of the rider, flexibility, intended usage, and riding preferences. Based upon these parameters, for example, custom bike manufacturers customize the bike's tube set to enhance the frame's ride quality. The methods of the present invention are easily applied to manufacturing scooters, wheelchairs, carriages, cycles, bicycles and similar vehicles.

BRIEF DESCRIPTION OF THE DRAWINGS

FIG. 1 shows a bicycle frame manufactured using a method of the present invention.

FIG. 2 is a fragmentary detail view of a top tube bonded to an upper anchor via a hollow tab molded onto the upper anchor.

DETAILED DESCRIPTION OF THE INVENTION

Figure 3:
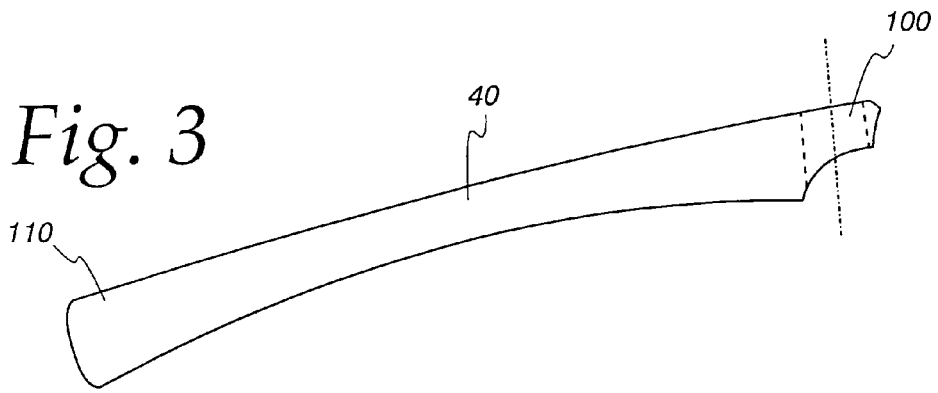
FIG. 3 is a side elevational view of a top tube of the invention having a through hole oriented perpendicularly to the axis of the top tube.
Figure 4:
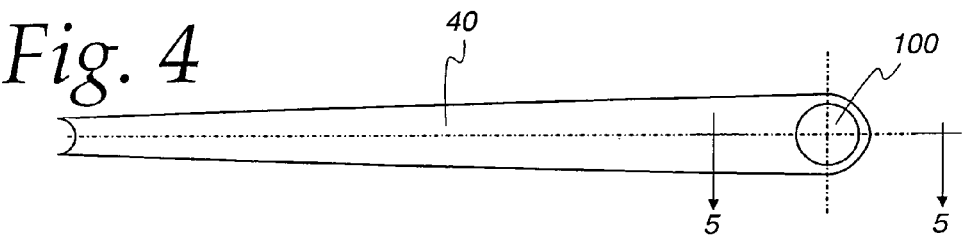
FIG. 4 is a top plan view of the top tube shown in FIG. 3.

This invention is concerned with an all composite vehicle frame, and in particular a bicycle frame made of joined parts comprising carbon fibers impregnated with resin, for example. Once the parts are assembled, the resulting frame provides the appearance of a molded carbon frame, or monocoque frame. This frame is completely customizable; any shape and size of tube, and any angle between tubes, can be used in the manufacturing process without limiting customization. In a preferred embodiment, rider information is imputed into the bike building process as weight of the rider, height of the rider, flexibility, intended usage, and riding preferences, among other factors. Based upon these parameters, for example, customized bike manufacturers customize the bike's tube set to enhance the frame's ride quality.

Segments of the customized frame of the present invention are joined using tabs 50 imbedded into or molded as part of an anchor. Each tab is integrated into the anchor and formed (e.g., molded) as a hollow element. As illustrated in FIG. 2, the tabs 50 can be shaped similarly to tomb stones or tongues. They have an external shape 25 that closely matches the mating tube's or part's inside shape so that the bonding gap is easily maintained. Additionally, the tabs are provided with a curvilinear taper on the distal top 5 and the sides 10 in order to facilitate an extremely wide range of tube joint angles. The amenability of the corresponding joints having these tabs allow for complete customization because the overlying tube 40 can fit over the tab 50 in any of a wide range of angles.

Figure 6:
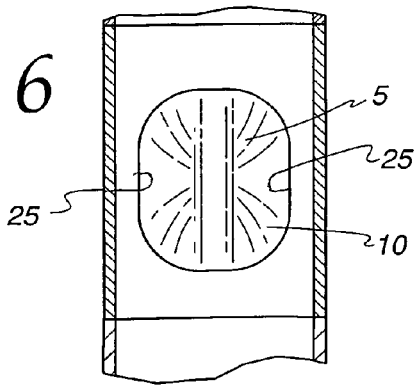
FIG. 6 is a fragmentary cross-sectional view taken substantially in the plane of line 6-6 in FIG. 2.

The tabs 50 are generally rectilinear in cross-sectional shape, and thus have flat sides 25 (FIG. 6). The tabs 50 are coated with a bonding agent as described below, to allow for adequate bonding coverage between the tab and mating tube while simultaneously providing for full angle adjustability. In addition, the rectilinear cross-sectional shape and flat sides provide a safety mechanism by facilitating alignment of the mating parts, and by preventing the mating part from rotating if it were to fully delaminate from the tab.

Each tab has an additional feature which is a groove 27 (FIG. 2) or trough, that extends around the circumference of the tab at its base. This "catch" groove fills with a bonding agent during assembly and serves as a failsafe to prohibit the part from separating once the bonding agent dries. Once the bonding agent has filled the groove and cured, it creates a mated groove interface that makes it extremely difficult for the bonding agent and the parts to separate.

Each anchor with its molded tab(s) is essentially ready for final assembly when it comes out of the mold after the proper preparation and clean up that any carbon part would require, as understood by someone skilled in the art. The mating tubes require two steps of machining. First, each tube is coped (cut or mitered) to a length, and at an angle (at its axial end(s)), for whatever frame geometry is required. This can be of any length or angle; the tube and the entire frame are fully customizable. The tube is then deburred; any sharp edges or flashing are removed. The tube is then set in a fixture that holds it in line with the desired axis orientation required by the frame design. A router is then employed at the coped end of the tube, axially and on the inside diameter. The router cuts to the shape of the tab plus roughly 0.010 inches, to account for a gap for the bonding agent. This routing ensures that the part will fit adequately and maintain the correct bonding agent gap.

Once the tube is machined, the area of machining inside the tube is thoroughly coated with a bonding agent, as is the exterior of the tab on the anchor, and the anchor and tube are joined together by telescoping the tube over the tab and locating the tube in the desired position with respect to the tab and adjacent frame parts.

The bonding agent used here can be of any known and suitable type. One such bonding agent is Hyson 9460, a two-part epoxy available from Loctite Corporation, 1001 Trout Brook Crossing, Rock Hill, Conn. 06067-3910.

To permanently join the subassembly tubes, the subassembly is put together as described here. Any excess bonding agent is wiped away. Then the subassembly is put in an oven at approximately 250 degrees Fahrenheit for approximately 60 minutes; depending on the bonding agent used. Once removed, the subassembly is complete. This process is repeated to join all segments of a frame. All part joints can be cured simultaneously, or in stages. Depending on the bonding agent, re-curing the subassemblies does not typically damage the parts.

The ideal bonding conditions will vary depending on the agent used. Common parameters include a temperature range of 60-80 degrees Fahrenheit, ambient atmosphere, 40-50% humidity, ambient pressure, full cure time of 8 hours at room temperature followed by 60 minutes at 250 degrees or 3 days at 77 degrees.

The foregoing description is easily applied to the manufacture of scooters, wheelchairs, carriages, cycles, bicycles and similar vehicles.

The illustrated frame, which represents one embodiment of the present invention, consists of about nine molded parts. These elements may be made of carbon fiber impregnated with resin or other suitable material. Other parts, if made of metal, can be fabricated through casting, forging, and/or machining.

The upper anchor 35 is shown in FIG. 2. It is fabricated with two tabs 50 imbedded therein or molded as part thereof. Each of the tabs 50 engages and is ultimately bonded to one of two mating parts, a top tube 40 and a seat stay 85 (FIG. 1).

Once the top tube is machined, the area of machining is coated with a bonding agent along with the exterior of the corresponding tab on the upper anchor. The top tube and the upper anchor are then joined together. Any excess epoxy is wiped clean and then the subassembly is cured as described above. Once removed, the subassembly is complete.

Seat tube extensions 45, 60 and/or anchor extensions 56 are configured so that any seat tube length can be used while simultaneously integrating with the seat tube extension and anchor extension in a way that makes this integrated framework appear to be a single seamless part. The parts appear to be one molded piece, but the frame size and shape is completely customizable. These extensions 45,56,60 are from the same mold and are simply cut to length for whatever size bicycle frame is desired. The bottom of one part mates to the top of the next part or vice versa. Alternatively, both ends of some parts can make up the bottom or top of other parts.

The bottom bracket anchor 55 also includes two tabs that are integrated in the molding process. These two tabs are secured to the mating parts, a down tube 75 and a chain stay element 80.

The head tube 70 can be created from a variety of material and fabrication methods, such as machining, extruding, filament, winding or any other method known to someone skilled in the art that will yield a tube of the desired shape. The head tube 70 can have a round, oval, pear, or a teardrop cross-sectional shape. The elongation of a teardrop shaped tube can either be constant or it can vary over the length of the tube, depending on the tube usage. The materials from which the head tube 70 is made can be, but are not limited to, aluminum, carbon, and titanium or any other material suitable for use in manufacturing bicycle frames. Metal head tubes are often employed in carbon frame manufacturing because of the tube's interface with the metal head set. The headset can easily damage a carbon surface so, if a frame builder uses a carbon head tube, the builder will also apply metal insert for the headset. An entire metal head tube can actually be lighter and more effective than a hybrid of carbon and metal. Additionally the metal head tube has little to no impact on the ride characteristic of the frame. It is preferable that carbon—with metal inserts—or titanium be used in the manufacturing of the head tube. At or near its upper end, the head tube 70 will pass through and be bonded into the through hole opening in the top tube 40. At or near its lower end, the head tube 70 will pass through and be bonded into the through hole opening in the down tube 75. The head tube will accept the fork steerer.

Figure 5:
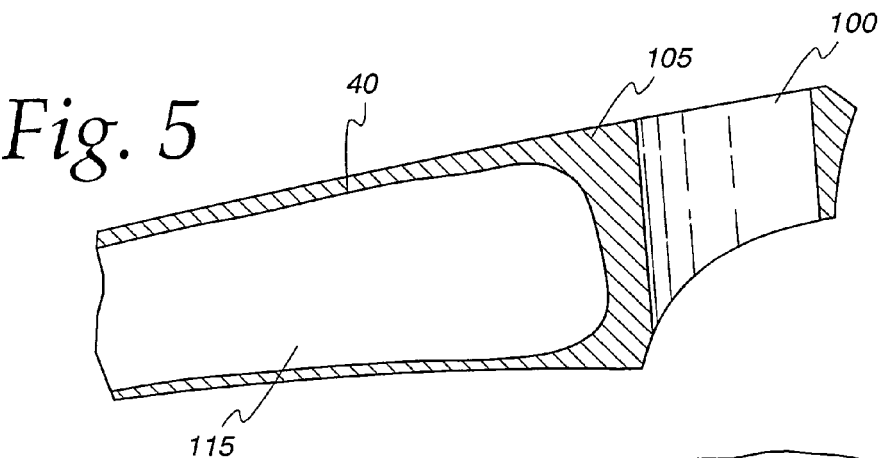
FIG. 5 is a fragmentary cross-sectional view taken substantially in the plane of line 5-5 in FIG. 4.

The top tube 40 is fabricated using the same method as the upper anchor 35. The top tube 40 is a hollow molded carbon fiber part. The front end of this tube is molded in such as way that it is closed by the illustrated "eye" structure 105. FIG. 5 (it is a hollow tube that is open only on one end, the rear). A through hole 100 has an axis extending perpendicularly to the axis of the top tube part. The hole provides an undersized starter hole for the machining step of customizing and sizing the through hole to allow the head tube 70 to pass through at a specified and customized angle. Once the through hole is machined, it is deburred, i.e. all flashing and sharp edges are removed and it undergoes secondary filing so that the parts fit together with little to no gap. Next the surface that will be bonded is prepared. This typically consists of roughing up the surface through sand blasting, rough machining, hand sanding, or a similar method. Then the part is degreased with acetone or similar cleaning agent or solvent. It is affixed by a bonding agent to the head tube 70. The rear end 110 of the top tube 40 is joined to the upper anchor 35 as described above; the top tube and the upper anchor are bonded together. This unique design with its epoxy groove is a failsafe arrangement so that the parts cannot catastrophically separate.

The down tube 75 is fabricated, machined, and bonded in much the same process as for the top tube 40. In accordance with the invention, the down tube 75 is can have any cross-sectional shape desired. As suggested here, the tubes are multishaped over their lengths. The front end of this tube is molded in such as way that it is closed (it is a hollow tube that is open only on one end). The front end of the down tube has an opening (the "eye") and looks like a needle. The through hole has an axis which is oriented perpendicularly to the axis of the down tube part. The hole provides an undersized starter hole for the machining step of customizing and sizing the through hole to allow the head tube 70 to pass through at a specified and customized angle.

The chain stays element 80 is hollow and looks somewhat like a tuning fork. It connects to the bottom bracket anchor 55 in the same way as the top tube 40 connects to the upper anchor 35.

The seat stay element 85 is also hollow. It has a router-made cutout to mate with the tongue of the upper anchor 35.

Dropouts 90 are standard on all bicycles. The dropouts are either metal or carbon—typically metal—and serve the purpose of holding the wheel axle and rear derailleur safely and perpendicularly to the bicycle frame.

For each bicycle, there is a saddle holding mechanism 60,45. This illustrated mechanism allows the seat tube to extend into the saddle; therefore, a customary seat post is not needed. The seat tube has an aerodynamic shape. The saddle holding mechanism system is not a requirement for this type of joining methodology. It is an option. The seat tube could be round, oval, pear, or tear drop shaped. The saddle holding mechanism could optionally be a traditional seat post.

There are other known components necessary to be incorporated onto the frame to manufacture a complete bicycle. These components include forks, stems, seat posts, crank sets, and wheels of known design.

Although a preferred embodiment of the bicycle frame and method of making a bicycle frame has been disclosed, it is to be understood that the present disclosure is made by way of example; and that variations are possible without departing from the subject matter coming within the scope of the following claims.

I claim:

1. A method of manufacturing a lightweight vehicle frame having completely customizable geometry, wherein the method comprises bonding a first cured hollow reinforced resin composite tube to a part having a tapered tab at a predetermined one of a variety of possible attachment angles, and connecting the tube to the part at said predetermined attachment angle between the tube and the part, wherein the bonding results in the first tube overlapping the tapered tab and affixing the tube to the part at said angle.

2. The method of claim 1, wherein the tab has a non-circular cross sectional shape and wherein the tab has a curvilinear taper extending away from the tube and in the direction of the first tube thereby allowing the attachment angle of the first of tube, in relation to the part, to be customized and adjusted.

3. The method of claim 1, wherein the first and the part are sized according to rider information.

4. The method of claim 3, wherein the rider information is selected from the group consisting of rider weight, rider height, flexibility, and intended usage.

5. The method of claim 1, wherein the bonding comprises the step of coating the tab with a bonding agent and bringing into contact the first tube and the tab and the bonding agent so that the first tube overlaps the coated tab.

6. The method of claim 5, further comprising the steps of wiping away excess bonding agent and baking the bonded parts at approximately 250 degrees Fahrenheit for approximately 60 minutes.

7. The method of claim 5, wherein said bonding agent includes epoxy material.

8. The method of claim 1, wherein said tab has at least one groove over the circumference of the tab at its base.

9. The method of claim 1, wherein the vehicle is selected from the group consisting of a wheelchair, scooter, and bicycle.

10. The method of claim 9, wherein the vehicle is a bicycle.

11. A method of manufacturing a lightweight vehicle frame having completely customizable geometry, the method comprising the steps of:

determining the attachment angle at which a first cured hollow reinforced resin composite tube should be affixed to another frame part from at least one previously selected angle determinator;

and thereafter bonding the tube to the part at the predetermined attachment angle by means of a tapered tab previously affixed to the part.

* * * * *